No. 610,879. Patented Sept. 13, 1898.
W. H. NESBITT.
NUT LOCK.
(Application filed Aug. 31, 1897.)
(No Model.)
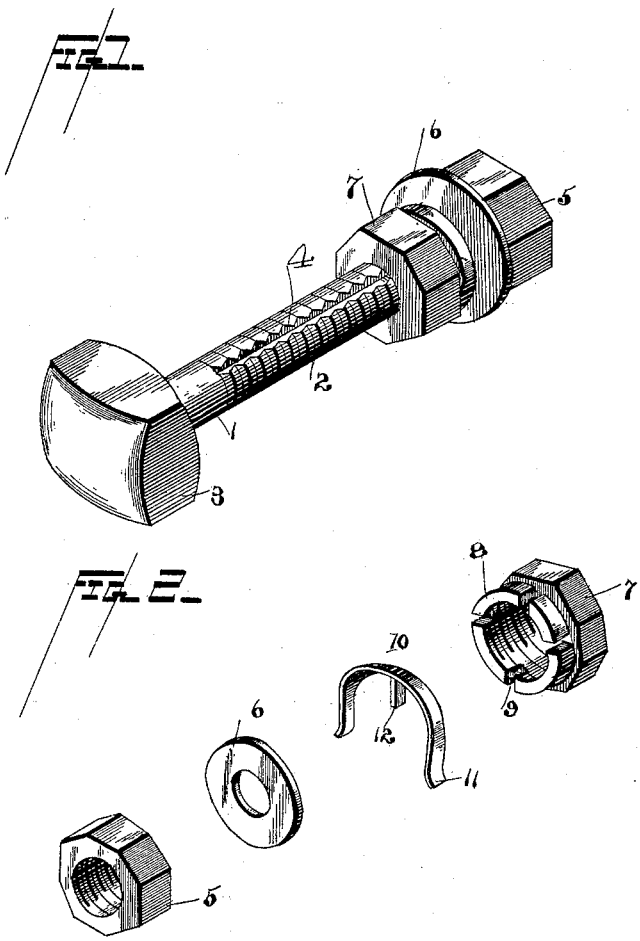
Witnesses
W. T. Vancoan
Victor J. Evans
Inventor
William H. Nesbitt.
by John Wedderburn
Attorney

UNITED STATES PATENT OFFICE.

WILLIAM H. NESBITT, OF ROLAND, CANADA.

NUT-LOCK.

SPECIFICATION forming part of Letters Patent No. 610,879, dated September 13, 1898.

Application filed August 31, 1897. Serial No. 650,141. (No model.)

*To all whom it may concern:*

Be it known that I, WILLIAM H. NESBITT, of Roland, in the Province of Manitoba, Dominion of Canada, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it consists of the construction and arrangement of the several parts, which will be more fully hereinafter described and claimed.

The object of the invention is to provide a positively-acting nut-lock wherein the parts may be quickly and easily applied and form a positive locking means against the accidental removal of the nut from vibration or other causes and may also be quickly dismembered to permit the securing-nut to be released.

In the accompanying drawings, Figure 1 is a perspective view of a nut-lock embodying the invention and shown applied in operative position. Fig. 2 is a similar view of the parts of the nut-lock dismembered.

Referring to the drawings, wherein similar numerals of reference are employed to indicate corresponding parts in the views, the numeral 1 designates a bolt which may be of any preferred length or diameter and has screw-threads 2 thereon, together with a head 3. Extending longitudinally of the said bolt is a groove 4, and adjustably mounted on the threads 2 is a nut 5, against which a washer 6 is placed. A locking-nut 7 is also adjustably mounted on the bolt 1 and has an annular collar 8, with slots 9 radially arranged therein and extending therethrough. The said collar 8 is located on the inner side of the nut 7 and is adapted to have its inner face bear against the washer 6. After the parts are thus arranged a locking-yoke 10, constructed of spring material and having outwardly-bent free ends 11, is placed over the said collar 8, and passing through either one of the radial slots 9 is a locking-tongue 12, which is long enough to reach into the groove 4 and prevent turning of the nut 7 and consequently obstruct the outward movement or release of the nut 5. The said yoke 10 is held entirely in connection with the collar 8 by its inherent resiliency, and in removing the same the outwardly-bent ends 11 thereof are sprung apart to break the contact with the outer surface of the collar, and the tongue 12 is shoved out of the slot 9, with which it may have been in engagement, and also at the same time released from the groove 4. The nut 7 can then be readily detached from the bolt 1 and also the nut 5 and washer 6.

The nut-lock heretofore described is adapted to be used for many purposes and wherever found applicable, either upon vehicles or in securing railroad-joints, and its dimensions, as previously stated, will be varied in accordance with the use.

It is obviously apparent that many minor changes in the details of construction and arrangement of the several parts might be made and substituted for those shown and described without in the least departing from the nature or spirit of the invention.

Having thus described the invention, what is claimed as new is—

1. In a nut-lock, the combination with a bolt having a longitudinal groove through the threads thereof, a nut and washer removably mounted on said bolt, a locking-nut having an annular collar with radial slots therein, and a spring-yoke having a tongue at the center thereof adapted to pass through one of the said slots and into the groove in the bolt, substantially as described.

2. In a nut-lock, the combination with a longitudinal grooved bolt, of a locking-nut having an annular collar with radial slots therein, and a spring-yoke provided with a central inwardly-extending tongue adapted to pass through one of the slots in the annular collar and engage the groove in the bolt, the said yoke being held on the collar solely by its spring tension, substantially as described.

In testimony whereof I have signed this specification in the presence of two subscribing witnesses.

WILLIAM H. NESBITT.

Witnesses:
M. M. MCLAREN,
ARTHUR A. HOBKURK.